United States Patent [19]

Brown

[11] Patent Number: 5,547,579
[45] Date of Patent: Aug. 20, 1996

[54] PROCESS AND APPARATUS FOR PURIFICATION OF CONTAMINATED ACIDS

[75] Inventor: Craig J. Brown, Pickering, Canada

[73] Assignee: Eco-Tec Limited, Pickering, Canada

[21] Appl. No.: 376,193

[22] Filed: Jan. 20, 1995

[51] Int. Cl.⁶ .................................................. B01D 61/00
[52] U.S. Cl. ......................... 210/651; 210/652; 210/641; 210/644; 210/684; 210/690; 210/195.2; 210/257.2; 210/263
[58] Field of Search ..................... 210/651, 652, 210/641, 660, 661, 663, 681, 690, 195.2, 257.2, 263, 638, 684, 644

[56] References Cited

U.S. PATENT DOCUMENTS

| | | | |
|---|---|---|---|
| 4,276,177 | 1/1981 | Smith | 210/195.2 |
| 4,332,685 | 6/1982 | Nowlin et al. | 210/195.2 |
| 4,765,905 | 8/1988 | Kitamura et al. | 210/644 |
| 4,818,409 | 4/1989 | Puetter et al. | 210/644 |
| 5,062,960 | 11/1991 | Aoki et al. | 210/651 |
| 5,084,180 | 1/1992 | Boateng | 210/638 |
| 5,300,228 | 4/1994 | Sugaya et al. | 210/638 |
| 5,338,457 | 8/1994 | Cappozzola et al. | 210/652 |

FOREIGN PATENT DOCUMENTS

| | | | |
|---|---|---|---|
| 30472 | 10/1967 | Japan | 210/652 |
| 105546 | 1/1974 | Japan | 210/652 |

OTHER PUBLICATIONS

"The Application of Nanofiltration Membranes to the Treatment of Industrial Effluent and Process Streams" by K. Treffry-Goatley and J. Gilron. This paper was presented at a meeting on Membrane Technology in Wastewater Management, Cape Town, RSA, Mar. 1992.

"Purification of Sulfuric Acid Anodizing Solutions" by C. J. Brown, D. Davy and P. J. Simmons. Plating & Surface Finishing, Jan. 1979.

*Primary Examiner*—Ana Fortuna
*Attorney, Agent, or Firm*—Bereskin & Parr

[57] ABSTRACT

Acids contaminated with multi-valent metal salts are purified by a process which involves treatment in an acid sorption unit (ASU) and a nanofiltration unit (NFU). The feed solution can first be delivered to the ASU, which produces two solutions, one high in acid concentration and the other high in metal salt concentration. The high acid concentration solution can be treated in the NFU to produce an acid end product and a reject metal salt solution which can be recirculated to the feed of the NFU. Alternatively, the high metal salt solution can be treated in the NFU, and its permeate recirculated to the ASU as eluate. In an alternative configuration, the feed is delivered first to the NFU. In all cases, the membrane reject solution from the NFU is recirculated to increase the metal salt concentration. A second NFU can be used to process the solution from the ASU which contains a high metal salt concentration.

22 Claims, 4 Drawing Sheets

PROCESS AND APPARATUS FOR PURIFICATION OF CONTAMINATED ACIDS

FIELD OF THE INVENTION

This invention relates generally to the separation of multi-valent metal salts from acids, and is concerned more particularly with the purification of acids.

BACKGROUND

The development of environmentally-sensitive and cost-effective methods to treat and dispose of acidic waste effluent has taken on considerable importance in recent years.

The success of a waste treatment system depends upon the ability of the system to concentrate the waste effluent sufficiently before it is delivered to the treatment system. This is due to the fact that waste treatment systems are limited by hydraulic load. In addition, it is economically advantageous to use a system which allows the recovery of acidic product of high purity before the waste effluent reaches the treatment system.

An ideal separation process is one which is capable of handling waste effluents with varying concentrations of acid and metal, which can be adapted easily to deal with these varying concentrations in waste effluent solutions and which separates the metal salt from the acid solution with high efficiency.

Pressure-driven systems do not function well if the waste effluent has a high metal concentration. The range of application of pressure-driven membrane separation processes is limited by the osmotic pressure of the metal ions being rejected. Thus, as the metal concentration in the reject stream increases, the pressure which is applied to the membrane must be increased to compensate for the increased osmotic pressure.

Acid-sensitive systems do not operate well if the waste effluent contains a high acid concentration. This is due to the fact that most commercially available separation membranes are sensitive to acid and their life is inversely proportional to the strength of the acid being treated. Thus, if the waste effluent has a high acid concentration, it is necessary to either neutralize some of the free acid in the waste effluent or to remove some of the acid from the waste effluent before it reaches the acid-sensitive membrane.

Both of these means of reducing the acid concentration of a waste effluent have disadvantages, especially in the commercial context. The addition of a neutralization step to the separation process entails additional capital and operating costs for the neutralization chemicals. Acid sorption methods can be used to remove some of the acid from the effluent waste solutions. However, these methods require significant quantities of water to remove the acid from the acid sorption media. This represents an important disadvantage in settings with limited access to sources of water and where the price of water is often quite high.

DESCRIPTION OF THE PRIOR ART

Nanofiltration (NF) is a pressure-driven membrane separation process. It operates at low pressure and utilizes a semi-permeable membrane which is capable of permeating water, acid and some ionic salts and small solutes while rejecting multi-valent metal salts.

In a typical nanofiltration process, water containing mono-valent ions such as sodium and chloride is forced under pressure through a semi-permeable membrane while multi-valent ions such as calcium and sulfate are rejected. A common commercial application of the nanofiltration process is removal of calcium and magnesium sulfate hardness from water.

If a suitable acid-resistant membrane is utilized, the nanofiltration process can be used to separate dissolved multi-valent metal salt impurities from acids. For example, if a solution of aluminum sulfate and sulfuric acid were recirculated under pressure through an NF membrane module, the mono-valent hydrogen ions ($H^+$) would readily pass through the membrane along with water, while the multi-valent aluminum ions ($Al^{+++}$) would be rejected. Sulfate, which exists largely as bisulfate ions ($HSO_4^{31}$) under acidic conditions would be passed. In order to maintain electrical neutrality in the reject stream, an amount of sulfate equivalent to the aluminum would also be rejected. As a result, purified sulfuric acid would be collected as a permeate, while the concentration of aluminum sulfate would build up in the reject stream. If the reject solution were recirculated through the membrane module several times, the aluminum concentration would build up until the osmotic pressure of the aluminum approached the applied pressure, at which point the flux, or flow per unit of membrane area, would approach zero. At this point the reject solution, which would still contain the initial concentration of sulfuric acid but with a higher concentration of aluminum sulfate, could be dumped. Assuming the purified sulfuric acid permeate could be reused, a considerable saving of sulfuric acid would then be realized.

As with other pressure-driven membrane separation processes, such as reverse osmosis and ultrafiltration, the range of application of the NF process is limited by the osmotic pressure of the ions being rejected. As the metal concentration in the reject increases, the applied pressure must be increased to compensate for the increased osmotic pressure. FIG. 4 shows the flux rate for Filmtec NF45 membrane operating at a pressure of 500 psi on a solution containing a sulfuric acid concentration of approximately 190 g/L at different aluminum concentrations (added as aluminum sulfate). At low metal concentrations the flow capacity of a given system operating at a constant pressure would be relatively high, while at high metal concentrations its capacity would be much lower.

As a result, the NF process is limited to the treatment of solutions relatively low in metal concentration. On the other hand, since the multi-valent metals are rejected very efficiently by the NF membranes (rejection typically 90–98%), it is possible to produce an acid solution as permeate containing a very low concentration of metal salt using this technique. Moreover, in addition to separating the metal from the acid, the NF process has the ability to concentrate the metal to a significant degree.

A further limitation of the NF process is that most commercially available nanofiltration membranes are not very stable in strong acid solutions. Their life is inversely proportional to the strength of the acid being treated. In order to obtain a reasonable membrane life, it is therefore best to neutralize the free acid prior to NF treatment. This neutralization step is disadvantageous in that it entails additional capital and operating costs for neutralization chemicals and is a severe limitation to the commercial exploitation of the NF process.

Acid sorption systems, such as acid retardation and diffusion dialysis, provide an alternative to the NF process.

The process known as "acid retardation" involves strong base ion exchange resins which have the ability to sorb strong acids from solution while excluding metallic salts of those acids. Unlike nanofiltration, the acid retardation process is not pressure-driven. Contaminated acid and water are passed alternately through a bed of resin and, since the acid is readily stripped from the resin with water, the free acid is separated from the metal salt.

The process known as "diffusion dialysis" involves anion exchange membranes and lends itself to the separation of free acids from metal salts. Both acid retardation and diffusion dialysis systems are considered acid sorption systems.

An advantage of acid sorption systems is that, unlike in the NF process, the metal concentration does not appreciably affect their capacity. As a result, acid sorption processes are ideal for treating acids bearing a high level of metal contamination. On the other hand, in contrast to NF, the acid sorption processes do not have the ability to concentrate the metal salt and, in fact, the de-acidified metal salt stream produced by such a system is somewhat lower in metal concentration than the original solution. This can be a considerable disadvantage if the de-acidified metal salt stream requires subsequent treatment, for example in a waste treatment system which is limited by hydraulic capacity.

A further disadvantage of acid sorption processes is that the recovered acid produced, particularly with acid retardation, is not of high purity, typically containing 10–50% of the initial metal concentration. In other words, the metal rejection is only 50–90% which is appreciably less than that obtainable by the NF process which is typically 90–98%.

Finally, a further possible disadvantage of the acid sorption process is that it requires substantial quantities of fresh water to strip acid from the acid sorption media. Although water is usually very inexpensive, its availability is restricted under certain circumstances and its price can sometimes be significant.

SUMMARY OF THE INVENTION

An object of the present invention is to integrate the nanofiltration process with the acid sorption process in the treatment of waste effluent solutions. This combination overcomes the disadvantages of each individual process while exploiting their respective advantages and creates a synergy allowing for greater advantages than would be expected by simply coupling a nanofiltration process with an acid sorption process.

Specifically, the present invention provides a process for separating a multi-valent metal salt from an acid in a feed solution containing said metal salt and acid, the process comprising the steps of:

(a) treating a first solution containing said metal salt and acid in an acid sorption unit to produce a second solution having a lower acid concentration than said first solution;

(b) stripping acid from said acid sorption unit to produce a third solution;

(c) treating one of said second and third solutions in a membrane separation unit to produce a fourth solution having a reduced metal salt concentration, and a membrane reject solution having a higher metal salt concentration than said fourth solution; and, (d) collecting said fourth solution;

wherein the feed solution is either: (i) delivered to the acid sorption unit as said first solution, or (ii) combined with said third solution and the combined solution is delivered to the membrane separation unit for performing step (c), in which case said membrane reject solution resulting from step (c) is delivered to the acid sorption unit as said first solution.

A corresponding apparatus is also provided.

The present invention can be used to treat a waste effluent solution containing a high acid concentration and a high concentration of dissolved metal salt to produce an acid product with a very low metal concentration and a waste solution with a low acid and moderately high metal concentration.

In one aspect of the invention, the effluent solution is first fed to the acid sorption unit (ASU) to separate some of the metal salt from the free acid. The deacidified metal salt solution passes through as byproduct or system waste and the free acid is stripped from the ASU resin with water and fed to a nanofiltration unit (NFU) comprising the membrane separation unit of the process. Because a large portion of the metal is removed by the ASU, the osmotic pressure of the solution will be relatively low. Thus, the acid and water will pass through the NFU membrane at a high flux rate while a majority of the metal concentration is rejected. The metal reject solution can then be recirculated to the NFU to increase the concentration of the metal salt, before being recycled back to the feed of the ASU.

The deacidified metal salt product from the ASU may be concentrated by a second NFU, and the permeate from the second NFU (having a low acid concentration and a low metal salt concentration) recycled back to the ASU to replace some of the water used to strip acid from the ASU resin.

In yet another form of the invention, the deacidified metal salt solution from the ASU is fed to the first NFU. Here as well, the metal reject solution from the NFU can be recirculated to the NFU to increase the concentration of the metal salt product. The permeate from the NFU, on the other hand, which contains a low concentration of acid and a very low concentration of metal salts can either be collected or used to replace a portion of the fresh water for stripping acid from the ASU resin.

Thus, while the NFU lowers the metal concentration of the final product, the ASU decreases the amount of acid lost in the reject stream. Furthermore, by decreasing the metal or the acid concentration of the effluent waste before it reaches the NFU, the ASU improves the efficiency of the NFU and allows the use of an NFU membrane which is less resistant to acid than would be the case if the solution were treated directly. In addition, the use of the NFU permeate to strip acid from the ASU is a distinct advantage where water quantities are limited.

The present invention can also be used to treat waste effluent solutions with a high acid concentration and a moderately low metal concentration to produce a final product with a low metal concentration. In this case, the effluent solution is combined with the acid product from the ASU and fed to the NFU. The NFU permeate, namely the final acid product, will have a high acid concentration and a very low metal concentration. The NFU reject, on the other hand, once it has been sufficiently concentrated in metals, will have a high acid concentration and a high metal concentration. The NFU reject is then diverted back to the ASU to remove and recover some of the acid.

In this case, the NFU increases the metal concentration of the effluent waste product, thereby decreasing the size of the ASU required to treat it and facilitating its subsequent processing. In addition, the use of the ASU, in combination with the NFU, increases the acid recovery of the system.

BRIEF DESCRIPTION OF THE DRAWINGS

In order that the invention may be more clearly understood, reference will now be made to the accompanying drawings which illustrate a number of preferred embodiments of the invention by way of example: In the drawings.

DESCRIPTION OF PREFERRED EMBODIMENTS

Figure 1:
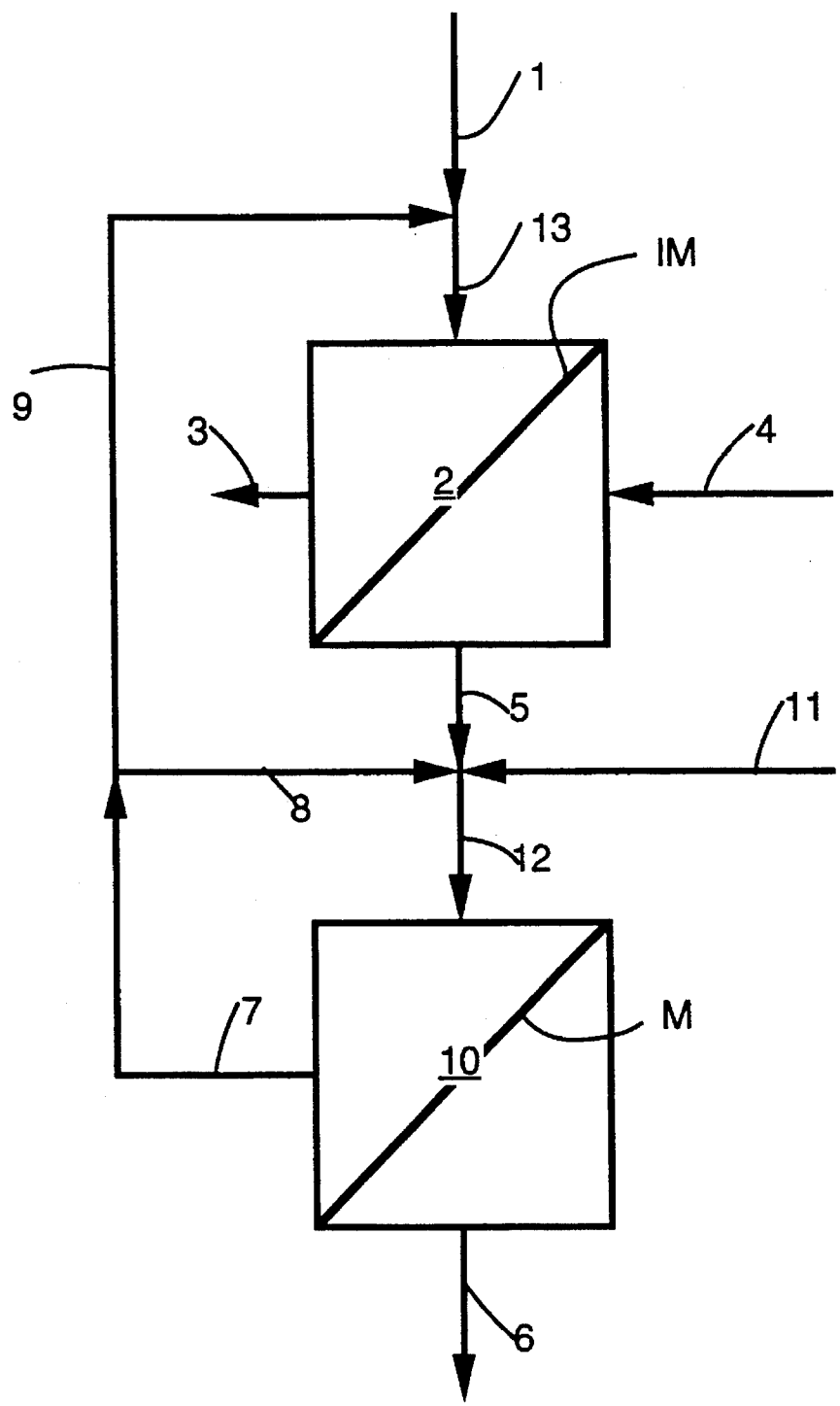
FIGS. 1 to 3 are diagrammatic illustrations of a number of preferred embodiments of the process and apparatus of the invention.

A general arrangement of one embodiment of the invention is shown in FIG. 1. This first embodiment would find particular advantage in two general cases.

In the first case, the solution to be treated contains a high acid concentration and a high concentration of dissolved metal salt impurity and it is desired to produce an acid product containing a very low metal concentration. This feed solution 1 is first fed to the acid sorption unit (ASU) 2 containing an ion exchange media denoted IM. Although the acid sorption unit can be of either the acid retardation type, which employs media in the form of particulate ion exchange resins, or the diffusion dialysis type, which employs ion exchange membranes as the media, for simplicity, the invention will henceforth be described in terms of the acid retardation type. A typical example of this unit is the APU™ manufactured by Eco-Tec Inc. An example of a typical diffusion dialysis membrane would be Neosepta AFX made by Tokuyama Soda Co. or Selemion DSV made by Asahi Glass Co. The majority of the free acid is removed from this solution by the ASU and a de-acidified solution 3 containing metal salt passes through, typically as a "byproduct" or system waste. Although this stream will not necessarily always be waste per se, since in many cases the value of this de-acidified metal-bearing stream may far exceed the value of the purified acid, it will be henceforth termed "waste" for the sake of simplicity in the discussion. Acid "product" is stripped from the resin with water 4 to yield another solution 5 typically containing 90–95% of the feed acid concentration with only 10–50% of the metal concentration of the first solution. The metal concentration of this "product" can be considered only moderately low and may in practice not be low enough for various reasons.

According to this invention, the purified acid product 5 from the ASU is next fed to a nanofiltration unit (NFU) 10 utilizing a semi-permeable membrane M which is capable of permeating water and acid under the influence of pressure while rejecting multi-valent metal salts. A suitable membrane for use with this invention would be Filmtec NF45 from Dow Chemical. Because a large portion of the metal has been removed by the ASU, the osmotic pressure of the solution will be relatively low. As a result, the acid and water will pass through the membrane at a high flux rate and this solution 6 will be collected as the final product of the system. The majority of the metal contamination will be rejected by the membrane thereby producing another solution 7 which is circulated back to the NFU via line 8 and mixed with the product solution 5 from the ASU. By recirculating the NFU reject solution in this manner, the concentration of the metal salt can be increased several fold. When the concentration of metal salt in this solution has reached the desired level or a point where the flux has reached a low acceptable limit, it is diverted via line 9 back to the feed inlet of the ASU. The amount of solution diverted back to the ASU in this way is large enough so that the amount of metal in this stream is equal to the amount of metal contained in stream 5 which is fed to the NFU, less the amount of metal contained in stream 6, the NFU permeate.

By this means, it is possible to treat a feed solution 1 containing a high acid and high metal concentration, producing a final acid product 6 containing a high acid but very low metal concentration and a waste solution 3 containing a low acid and moderately high metal concentration.

If the ASU were used by itself (i.e. with no NFU), the acid product produced would contain a higher metal concentration than is achievable with this invention. On the other hand, it is less advantageous to employ an NFU by itself, due to the low flux that accompanies treatment of feeds with a high metal concentration. A high metal concentration increases the osmotic pressure of the solution and consequently reduces the permeate flux rate at a given applied pressure. Even if the metal concentration in the feed were low enough that it were feasible to use the NFU by itself, the waste or byproduct solution (i.e. the reject stream) would still contain a higher acid concentration than that achievable with the invention.

The second general case in which the first embodiment of the invention would find particular advantage is where the feed solution contains a high acid concentration and moderately low metal concentration. The invention would produce an acid product with a very low concentration of metals (i.e. lower than the metal concentration in the feed), while producing a byproduct with low acid and moderately high metal concentration (i.e. metal concentration higher than the feed).

In this second case, the feed solution to be treated is indicated at 11 (there is no feed via line 1) and is combined with the acid product 5 from the ASU 2 upstream of the NFU 10. The NFU permeate 6, which would again be the final acid product, would contain a high acid concentration and very low metal concentration. After it has been sufficiently concentrated in metals, the NFU reject stream 7 which would contain a high acid and high metal concentration is diverted to the ASU via line 9 as above. In practice, a portion of the reject 8 from the NFU may be recycled back to the inlet of the NFU and combined with the feed. The ASU would remove the acid from this stream and produce another solution 3 which is a byproduct or waste containing low acid and high metal. Water 4 would strip solution 5 from the ASU as an acid product containing a high acid and moderately low metal, which would be combined with the feed solution 11 to be fed to the NFU.

In this second case, an ASU used alone would produce a waste containing a much lower metal concentration than that achievable with the invention. If this waste were to be subsequently processed, for example by chemical neutralization and precipitation in a waste treatment system, the increased concentration achievable with the invention would be considered a significant advantage. Even more importantly, the size of the ASU required to treat such a dilute metal stream would have to be much larger. As another alternative, an NFU used by itself would produce a waste (i.e. the reject), containing a higher acid concentration than that achievable with the invention so that the acid recovery efficiency would be much lower.

Figure 2:
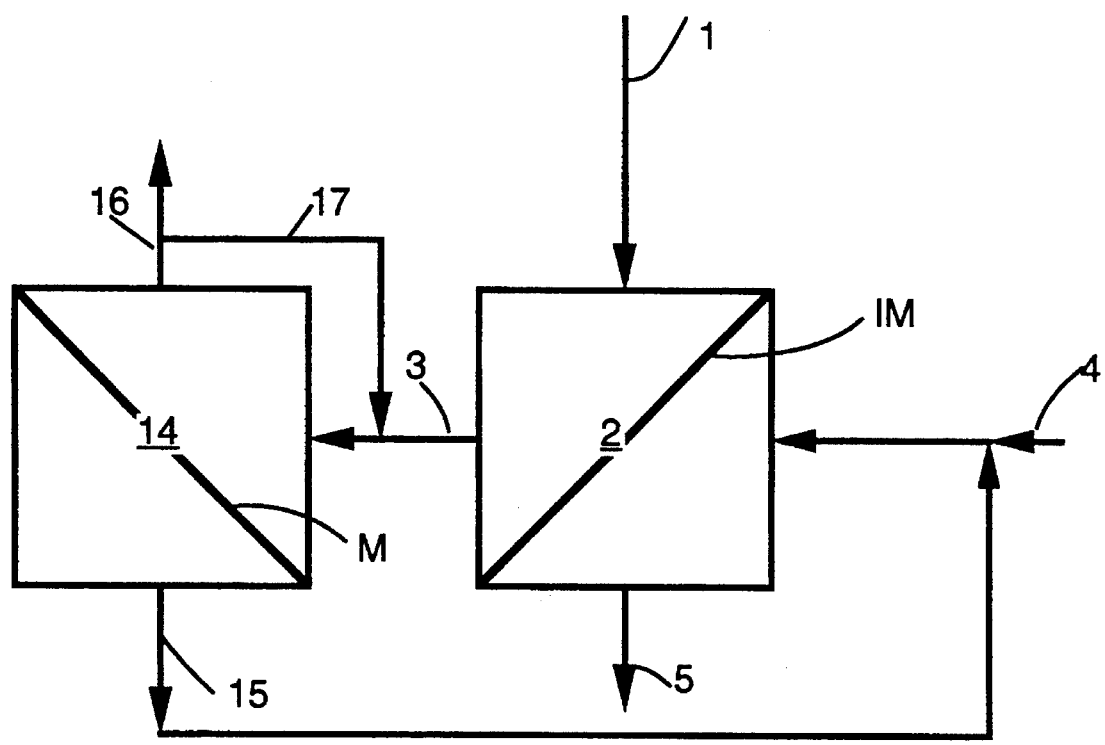

In the second embodiment of the invention the feed solution to be treated contains a high concentration of acid as well as a concentration of dissolved multi-valent metal salt. Referring to FIG. 2, the feed solution is denoted 1 and is first treated by an ASU 2. The metal salt byproduct solution 3, which contains a very low concentration of acid and a somewhat lower metal concentration, is then fed to an NFU 14. Because the acid concentration in the ASU byproduct solution is much lower than that in the feed solution, it is possible to utilize an NF membrane which is less resistant to acid than would be the case if the feed solution were treated directly, without pre-treatment, with the ASU.

The reject 16 from the NFU is recirculated through the NFU via line 17 until it reaches the desired concentration or until the permeate flux has declined to a lower limit due to the increased osmotic pressure of the solution. At this point a portion of the reject solution is collected. The NFU can be operated so that the entire reject flow is collected periodically or it can be operated so that a relatively small portion of the reject solution is collected on a continuous basis. The reject that is collected is more concentrated in metal salts than the original feed solution 1. It can be utilized as is, or further processed by another process, such as evaporation, to further concentrate it or by alkali neutralization to precipitate out the metals.

The permeate 15 from the NFU, contains a low concentration of acid, approximately equal to that of the ASU byproduct 3 and a very low concentration of metal salts. This permeate can be collected and/or subsequently treated by another process such as alkali neutralization. Fresh water 4 is normally employed to strip the acid product from the ASU. According to this embodiment of the invention, the permeate from the NFU 15 can be used to replace a portion of the fresh water 4 for acid stripping, thereby reducing the fresh water requirements for the ASU process. In many cases the concentration of acid and metal salt in the NFU permeate would not allow discharge without further treatment. By recycling the NFU permeate in this manner, the need for further treatment is obviated.

Figure 3:
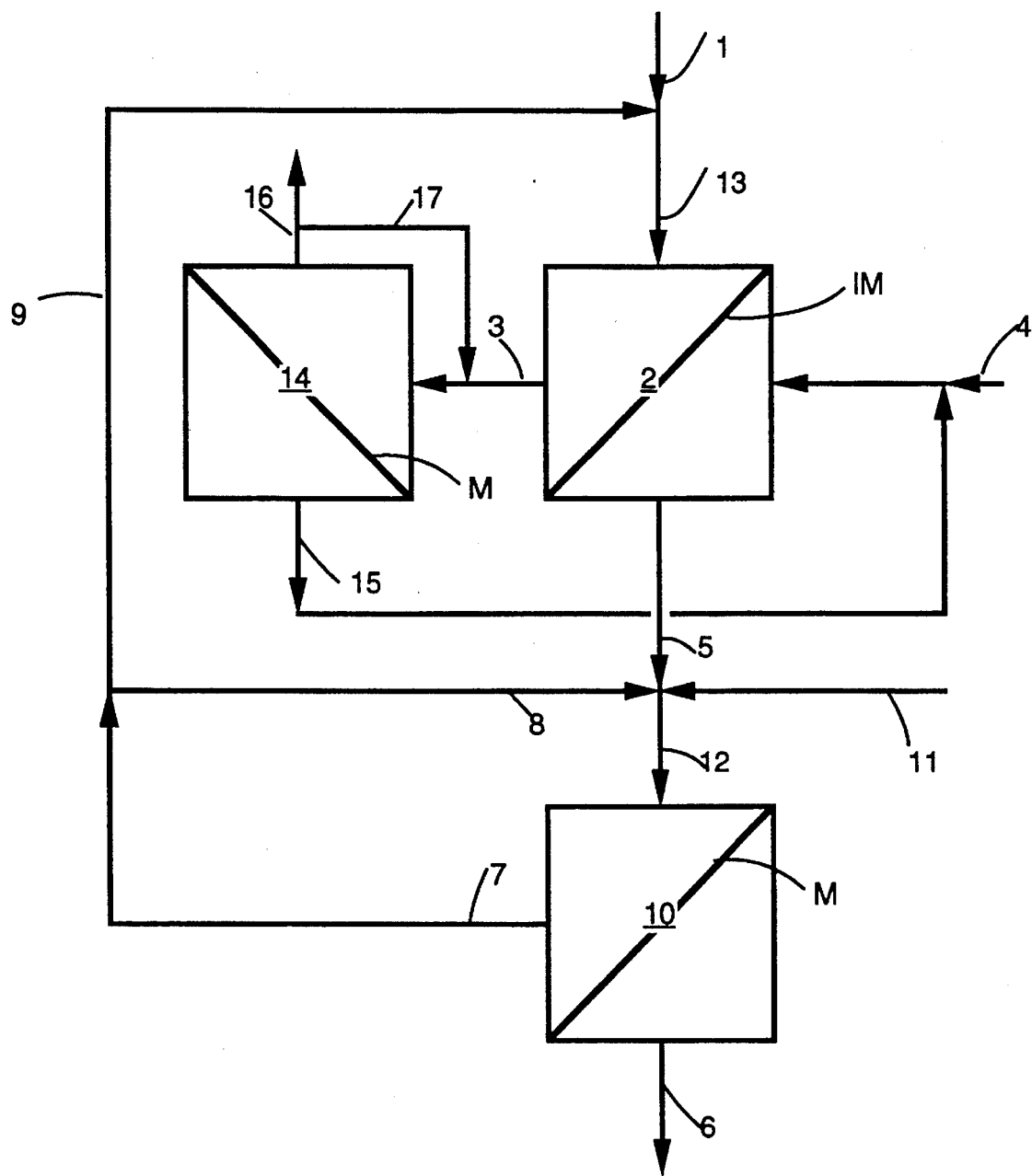

It is possible to combine both the above two embodiments of the invention to obtain a third embodiment as shown in FIG. 3. In this embodiment, the acid product 5 obtained by stripping the acid sorption unit with water is further purified by a first nanofiltration unit 10. The reject 7 from this first NFU containing a high concentration of acid and a high concentration of metal is recycled back to the feed of ASU 2. The de-acidified metal salt byproduct 3 from the ASU containing a low acid concentration and high metal salt concentration is concentrated by a second NFU 14 and the resulting permeate 15 containing a low acid concentration and low metal salt concentration is recycled back to the ASU for stripping acid from the acid sorption media.

The process of the invention is illustrated by the following examples. In these examples, the ASU employed is an Eco-Tec APU™ acid purification unit which is an acid retardation type unit and the NFU utilized a Dow Filmtec NF45 nanofiltration membrane module. A pressure of approximately 500 psi was applied to the NFU by a positive displacement pump.

EXAMPLES

Example 1

Example 1 illustrates the first case described above where a solution to be treated contains a relatively high level of metal contamination (in this example aluminum) and it is desired to produce a highly purified acid product (i.e. containing a very low level of aluminum contamination). The spent acid solution to be treated 1 in this case is first processed by the ASU as shown in FIG. 1 and as described first above. Table 1 shows the typical results that were achieved with the invention. References to streams in Table 1 match those represented in FIG. 1.

The system was operated for several hours until steady-state was achieved. The volumes of streams 1, 3 and 6 that were processed over a period of thirty minutes of operation were measured as noted in Table 1.

Based upon the NFU permeate that was collected as system product (stream 6), more than 99% of the aluminum has been removed, while recovering approximately 90% of the sulfuric acid. Expressed in a different way, with this invention, only $(4 \div 7.46) = 0.54$ grams of sulfuric acid would be lost in the system waste (stream 3) for each gram of aluminum removed compared to $(201 \div 9.63) = 20.9$ grams of sulfuric per gram aluminum if the invention were not utilized and the spent acid in stream 1 were discharged directly to waste.

Example 2

For comparison purposes, a solution to be treated similar to that used in Example 1 was fed to the ASU alone, without an NFU. The results are summarized in Table 2. The volumes shown were measured over one complete cycle of operation.

The principle advantage of the invention in this case over an ASU alone is the higher product purity (i.e. [Al]=0.01 g/L) obtained. This is evident from the results of this test. With the ASU alone, only 50% of the aluminum was removed compared to more than 99% with the invention. Although it may be possible to optimize the operation of the ASU to improve product purity, it is usually not practical to achieve more than 90% removal with an ASU alone.

Figure 4:
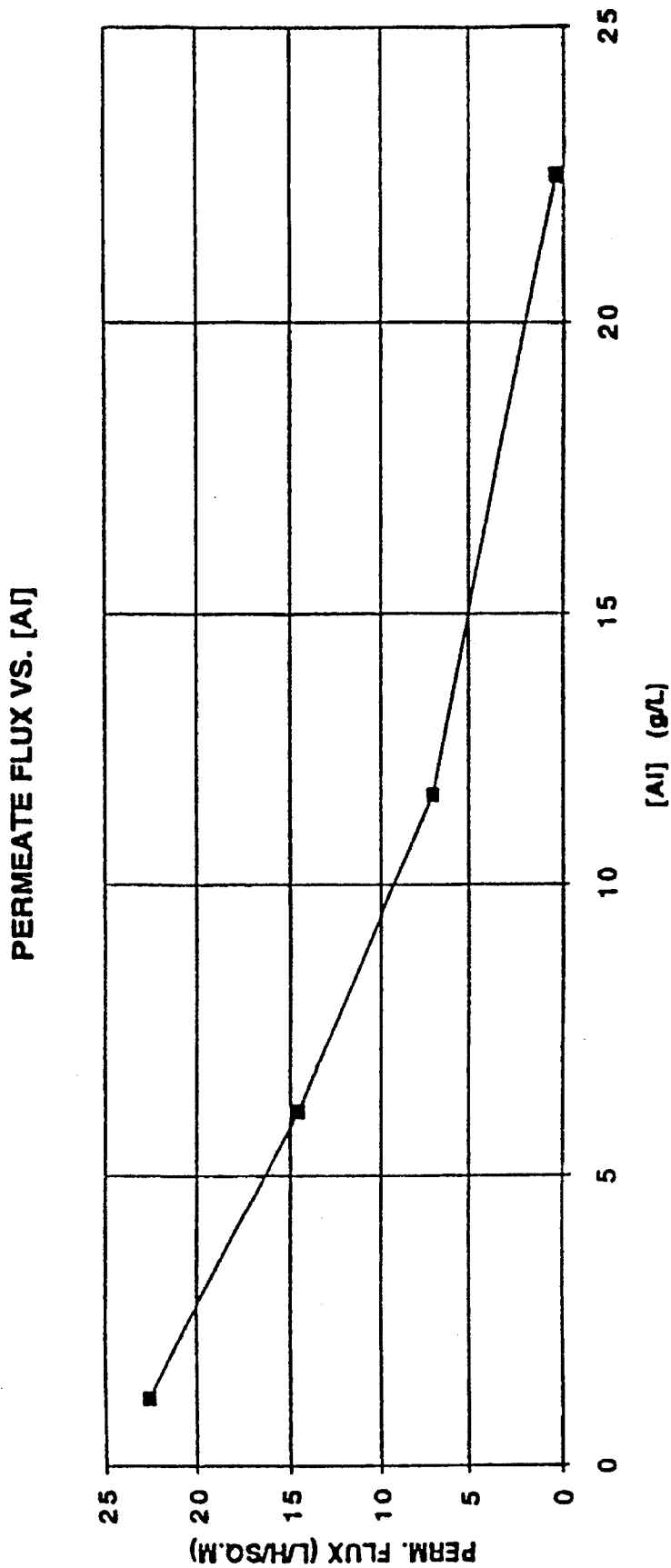
FIG. 4 is a graph showing the flux rate for Filmtec NF45 membrane operating at a pressure of 500 psi on a solution containing a sulfuric concentration of approximately 190 g/L as a function of aluminum concentration.

If the NFU were used by itself to treat the feed solution of Example 1, it would be necessary to concentrate the aluminum considerably higher than the initial level (i.e. approximately 10 g/L) to achieve appreciable net acid recovery. As shown in FIG. 4, a higher aluminum concentration would result in a significant reduction in permeate flux and increase the amount of NFU membrane area. For example, if the aluminum were allowed to increase from 10 g/L to 20 g/L, the flux would be reduced from 9 L/h/m$^2$ to 2 L/h/m$^2$ –a 78% reduction. This would increase the membrane area required by a factor of greater than four. If the reject were discharged at an aluminum concentration of 20 g/L, the acid loss would be $(201 \div 20) = 10$ grams acid lost per gram of aluminum removed, which is still considerably higher than with the invention (0.54 g/g) as shown in Example 1.

A key element of this embodiment of the invention is recycle of the NFU reject stream back to the ASU feed after allowing the metal concentration to build up. It is possible to employ an ASU and NFU together without recycling the NFU reject back to the ASU. The product from the ASU would be fed to the NFU to further decrease the metal concentration and the NFU permeate would be collected as system product as with the invention. However, after the NFU feed/reject stream was allowed to build up in metal concentration, it would be discharged to waste instead of recycled back to the ASU feed. This would result in a decreased overall acid recovery efficiency since the concentration of acid in the NFU feed/reject is much higher than in the ASU byproduct. For example, if the aluminum in the NFU feed/reject were allowed to build up to about 10 g/L as in Example 1, and then discharged to waste, about 50% of the total aluminum load would be removed in the ASU byproduct and about 50% would be removed in the NFU reject. The total acid lost would then be 0.5 (4÷7.46)+0.5 (163÷10)=8.42 grams acid per gram of aluminum removed. This is less than the NFU alone (10 g/g) but considerably more than with the invention (0.54 g/g) when the reject is recycled back to the ASU. Allowing the aluminum to accumulate to greater than 10 g/L would reduce this loss level somewhat; however, the size of the NFU would appreciably increase because of the reduced permeate flux at the higher metal level.

Thus it becomes evident that combining an acid sorption unit with a nanofiltration unit according to this invention, wherein the reject from the nanofiltration unit is recycled back to the acid sorption unit, is preferable to employing either unit by itself and preferable to using both units, wherein the NFU reject is not recycled to the ASU.

Example 3

Example 3 illustrates the second case described above for the first embodiment, where the solution to be treated contains a relatively low level of metal contamination, and it is desired to produce a highly purified acid product (i.e. containing a very low level of metal contamination), and a byproduct or waste containing a moderately high metal concentration. The spent acid solution to be treated in this case 11 is first processed by the NFU rather than the ASU as in Example 1. Table 3 shows the results of tests that were performed.

The system was operated for several hours until steady-state was achieved. The volumes of streams 11, 3 and 6, which correspond to those shown in FIG. 1 that were processed over a period of sixty-five minutes of operation, were measured as noted in Table 3.

In this case, more than 98% of the aluminum has been removed from the recovered acid. Only (6.4÷4)=1.6 grams of sulfuric acid were lost for each gram of aluminum removed compared to (192÷0.775)=247 grams of sulfuric per gram aluminum if the invention were not utilized and the spent acid were discharged to waste.

The minimum required size of the ASU used in the invention (i.e. the resin bed volume for an acid retardation unit, or the membrane area for a diffusion dialysis unit) to treat a given volume of feed solution would be much smaller than would be the case if the ASU were used by itself since the flow to be treated would be much less. In this example, the flow treated by the ASU was only 5.31 L/h compared to 35 L/h of system feed. Thus, an 85% reduction in size is achievable.

Based upon the results of this test, if the NFU were used by itself to treat the same solution, the size would be about the same as with the invention. However, the acid recovery efficiency would be considerably less. For example if the NFU were used to concentrate the aluminum up to 10 g/L and the reject were discharged to waste instead of being recycled to the ASU, the acid loss would be about (192÷10)= 19.2 grams per gram of aluminum, which is twelve times greater than that obtained with the invention.

Example 4

Example 4 illustrates the second embodiment of the invention shown in FIG. 2 wherein the solution to be treated, containing a high concentration of acid and a concentration of multi-valent metal salt, is first treated with an ASU. The de-acidified metal salt byproduct from the ASU is concentrated with an NFU and the permeate is mixed with fresh water for use in stripping acid from the acid sorption media.

An ASU was operated according to Example 2. The byproduct from the ASU was concentrated with the NFU utilizing a Filmtec NF45 membrane module operating at 600 psi. Initially fresh water was utilized for stripping acid from the ASU. Permeate was collected while the reject was continually circulated back to the feed tank. The solution in the feed tank thus became more concentrated in aluminum with time. The system was operated until the aluminum concentration in the NFU reject was 20–25 g/L. At that point the permeate was collected and mixed with fresh deionized water and utilized as eluant for stripping on the ASU in the correct proportion so that the permeate would be consumed by the ASU at the same average rate that it would be produced by the NFU. The system was operated for several hours under these conditions and the various streams were sampled and analyzed. The results are shown in Table 4. The volumes shown represent the volumes processed over one cycle of ASU operation.

This embodiment of the invention has a number of distinct advantages over the prior art. The amount of sulfuric acid lost with the system was only 1.33 grams per gram of aluminum removed. This compares to 20.9 g/g for direct discharge (i.e. no treatment) and compares quite favourably with use of an ASU alone (0.93 g/g). The concentration of aluminum in the system waste (22.9 g/L in NFU reject) is almost four times higher than that achieved with an ASU alone (5.8 g/L in ASU byproduct) and almost three times higher than that in the original spent acid itself. Thus the hydraulic loading on a waste treatment system treating the metal bearing waste would be substantially reduced. By reusing the NFU permeate as eluent on the ASU, the water consumption of the system was reduced to only one third of that required if the ASU were used alone, without the NFU. The acid concentration in the solution treated by the NFU is only 17.2 g/L which is about one tenth of the concentration of the spent acid itself. This would significantly increase the life of the nanofiltration membranes employed in most cases.

TABLE 1

| Ref | Stream Description | $[H_2SO_4]$ (g/L) | [Al] (g/L) | volume treated (liter) |
|---|---|---|---|---|
| 1 | spent acid (system feed) | 201 | 9.63 | 1.25 |
| 13 | mixed ASU feed | 185 | 9.95 | 2.78 |
| 4 | water | 0 | 0 | 1.62 |
| 3 | ASU byproduct (system waste) | 4 | 7.46 | 1.62 |
| 5 | ASU product | 175 | 4.5 | 2.78 |
| 12 | NFU feed | 163 | 9.04 | n.d. |
| 6 | NFU permeate (system product) | 180 | 0.01 | 1.42 |

TABLE 2

| Stream Description | $[H_2SO_4]$ (g/L) | [Al] (g/L) | volume treated (liter) |
|---|---|---|---|
| ASU feed | 178 | 7.5 | 0.408 |
| water | 0 | 0 | 0.238 |
| ASU byproduct | 5.4 | 5.8 | 0.238 |
| ASU product | 170 | 3.7 | 0.408 |

TABLE 3

| Ref | Stream Description | [H₂SO₄] (g/L) | [Al] (g/L) | volume treated (liter) |
|---|---|---|---|---|
| 11 | spent acid (system feed) | 192 | 0.775 | 35 |
| 13 | ASU feed | 180 | 6.5 | 5.31 |
| 4 | water | 0 | 0 | 3.1 |
| 3 | ASU byproduct (system waste) | 6.4 | 4.0 | 3.1 |
| 5 | ASU product | 170 | 3.69 | 5.31 |
| 12 | NFU feed | 180 | 6.0 | n.d. |
| 6 | NFU permeate (system product) | 191 | 0.01 | 36 |

TABLE 4

| Stream Description | [H₂SO₄] (g/L) | [Al] (g/L) | volume treated (liter) |
|---|---|---|---|
| ASU feed | 177 | 8.2 | 0.408 |
| ASU eluant | 19.6 | 0.2 | 0.238 |
| ASU byproduct | 24.5 | 7.89 | 0.238 |
| ASU product | 172 | 4.55 | 0.408 |
| NFU reject | 17.2 | 22.9 | 0.0791 |
| NFU permeate (recycled water) | 19.6 | 0.15 | 0.159 |
| fresh water (makeup) | — | — | 0.079 |

I claim:

1. A process for separating a multi-valent metal salt from acid in a feed solution containing said metal salt and acid, the process comprising the steps of:

(a) treating said feed solution in an acid sorption unit to produce a second solution having a lower acid concentration than said feed solution and collecting said second solution;

(b) stripping acid from said sorption unit to produce a third solution;

(c) treating said third solution in a membrane separation unit to produce a fourth solution having a reduced metal salt concentration, and a membrane reject solution having a higher metal salt concentration than said fourth solution; and, (d) collecting said fourth solution.

2. A process as claimed in claim 1, comprising the further step of recirculating said membrane reject solution through said membrane separation unit until the metal salt concentration in said solution reaches a defined level, and then collecting said solution, wherein, the collected membrane reject solution is delivered to the acid sorption unit as part of said feed solution.

3. A process as claimed in claim 1, wherein said second solution is treated in a second membrane separation unit to concentrate the multi-valent metal salt contained in said second solution and produce a permeate solution having low concentrations of acid and metal salt, and a second membrane reject solution.

4. A process as claimed in claim 3, wherein said permeate solution is recycled to the acid sorption unit and used to strip acid from said unit.

5. A process as claimed in claim 3, wherein said second membrane reject solution is combined with said second solution and recycled through the second membrane separation unit until a predetermined metal salt concentration is reached, whereupon said second reject solution is collected as product.

6. A process for separating a multi-valent metal salt from acid in a feed solution containing said metal salt and acid, the process comprising the steps of:

(i) providing an acid sorption unit for treating a first solution containing said metal salt and acid to produce a second solution having a lower acid concentration than said first solution, and a third solution comprising acid stripped from said acid sorption unit;

(ii) providing a membrane separation unit downstream of the acid sorption unit;

(iii) combining said feed solution with said third solution from the acid sorption unit and delivering the combined solution to said membrane separation unit;

(iv) treating said combined solution in the membrane separation unit to produce a fourth solution having a reduced metal salt concentration, and a membrane reject solution having a higher metal salt concentration than said fourth solution;

(v) collecting said fourth solution;

(vi) delivering said membrane reject solution resulting from step (iv) to the acid sorption unit as said first solution;

(vii) treating said first solution and said acid sorption unit to produce a said second solution having a lower acid concentration than said first solution; and (viii) stripping acid from said acid sorption unit to produce a said third solution.

7. A process for separating a multi-valent metal salt from acid in a feed solution containing said metal salt and acid, the process comprising the steps of:

(a) treating said feed solution in an acid sorption unit to produce a second solution having a lower acid concentration than said first solution;

(b) stripping acid from said acid sorption unit to produce a third solution and collecting said third solution;

(c) treating said second solution in a membrane separation unit to produce a fourth solution having a reduced metal salt concentration, and a membrane reject solution having a higher metal salt concentration than said fourth solution; and, (d) collecting said fourth solution.

8. A process as claimed in claim 7, wherein the fourth solution collected according to step (d) is recirculated to the acid sorption unit and used as eluent for stripping acid from said acid sorption unit according to step (b).

9. A process as claimed in claim 1 or 7, comprising the further step of recirculating said membrane reject solution through said membrane separation unit until the metal salt concentration in said solution reaches a defined level, and then collecting said solution.

10. A process as claimed in claim 1, 6 or 7, wherein the acid sorption unit is a diffusion dialysis unit having an ion exchange membrane.

11. A process as claimed in claim 1, 6 or 7, wherein acid sorption unit is a unit having ion exchange media comprising an ion exchange resin in particulate form.

12. An apparatus for separating a multi-valent metal salt from acid in a feed solution containing said metal salt and acid, the apparatus comprising:

an acid sorption unit containing a media capable of sorbing acid and rejecting metal salts, the unit having an inlet for said feed solution, an outlet for a second solution comprising a de-acidified metal salt solution, an eluent inlet, and an outlet for a third solution comprising a eluate high in acid and low in metal salt concentration;

a membrane separation unit containing a semi-permeable membrane which is capable of permeating water and acid under pressure while rejecting multi-valent metal salts, said membrane separation unit having an inlet, an outlet for a fourth solution comprising a permeate, and an outlet for a solution rejected by said membrane;

means coupling the inlet of the membrane separation unit with the outlet of the acid sorption unit for said third solution; and, means for delivering the feed solution to the inlet of said acid sorption unit.

13. An apparatus as claimed in claim 12, which further comprises means for coupling the reject solution outlet of said membrane separation unit with inlet of the acid sorption unit.

14. An apparatus as claimed in claim 12, further comprising a second membrane separation unit containing a semi-permeable membrane which is capable of permeating water and acid under pressure while rejecting multi-valent metal salts, said membrane separation unit having an inlet, a permeate outlet and an outlet for solution rejected by said membrane; and coupling means coupling said de-acidified metal salt solution outlet of the acid sorption unit with the inlet of the second membrane separation unit, whereby said second membrane separation unit can produce a permeate solution having low concentrations of acid and metal salt, and a second membrane reject solution.

15. An apparatus as claimed in claim 14, further comprising means for coupling said permeate outlet of the second membrane separation unit with the eluent inlet of the acid sorption unit, whereby permeate from said second membrane separation unit can be used to strip acid from said acid sorption unit.

16. An apparatus as claimed in claim 15, further comprising means for recirculating solution rejected by the second membrane separation unit through said second membrane separation unit for increasing the metal salt concentration of the solution.

17. An apparatus for separating a multi-valent metal salt from acid in a feed solution containing said metal salt and acid, the apparatus comprising:

an acid sorption unit containing a media capable of sorbing acid and rejecting metal salts, the unit having an inlet for said feed solution, an outlet for a second solution comprising a de-acidified metal salt solution, an eluent inlet, and an outlet for a third solution comprising a eluate high in acid and low in metal salt concentration;

a membrane separation unit containing a semipermeable membrane which is capable of permeating water and acid under pressure while rejecting multi-valent metal salts, said membrane separation unit having an inlet, an outlet for a fourth solution comprising a permeate, and an outlet for a solution rejected by said membrane;

means coupling the inlet of the membrane separation unit with the outlet of the acid sorption unit for said third solution;

means for delivering said feed solution to the inlet of the membrane separation unit, and, means for delivering said membrane reject solution to said acid sorption unit inlet after the metal concentration in said solution has reached a defined limit, for providing said feed solution.

18. An apparatus for separating a multi-valent metal salt from acid in a feed solution containing said metal salt and acid, the apparatus comprising:

an acid sorption unit containing a media capable of sorbing acid and rejecting metal salts, the unit having an inlet for said feed solution, an outlet for a second solution comprising a de-acidified metal salt solution, an eluent inlet, and an outlet for a third solution comprising a eluate high in acid and low in metal salt concentration;

a membrane separation unit containing a semipermeable membrane which is capable of permeating water and acid under pressure while rejecting multi-valent metal salts, said membrane separation unit having an inlet, an outlet for a fourth solution comprising a permeate, and an outlet for a solution rejected by said membrane;

means for coupling the inlet of the membrane separation unit with the outlet of the acid sorption unit for said second solution comprising de-acidified metal salt solution for producing a fourth solution having a reduced metal salt concentration, and a membrane reject solution having a higher metal salt concentration than said fourth solution.

19. An apparatus as claimed in claim 18, further comprising means coupling the permeate outlet of the membrane separation unit with the eluent inlet of the acid sorption unit.

20. An apparatus as claimed in claim 12, 17 or 18, further comprising means for re-circulating solution rejected by the membrane separation unit through said membrane separation unit for increasing the metal salt concentration in that solution.

21. An apparatus as claimed in claim 12, 17 or 18, wherein the acid sorption unit is a diffusion dialysis unit having an ion exchange membrane.

22. An apparatus as claimed in claim 12, 17 or 18, wherein said media capable of sorbing acid in said acid sorption unit is an ion exchange media comprising an ion exchange resin in particulate form.

* * * * *